(12) United States Patent
Zhao et al.

(10) Patent No.: US 11,314,121 B2
(45) Date of Patent: Apr. 26, 2022

(54) COLOR FILTER SUBSTRATE AND DISPLAY DEVICE

(71) Applicant: Wuhan China Star Optoelectronics Technology Co., Ltd., Wuhan (CN)

(72) Inventors: Chaojun Zhao, Wuhan (CN); Fei Ai, Wuhan (CN); Shiyu Long, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 299 days.

(21) Appl. No.: 16/613,910

(22) PCT Filed: Aug. 5, 2019

(86) PCT No.: PCT/CN2019/099218
§ 371 (c)(1),
(2) Date: Nov. 15, 2019

(87) PCT Pub. No.: WO2020/232834
PCT Pub. Date: Nov. 26, 2020

(65) Prior Publication Data
US 2021/0364850 A1    Nov. 25, 2021

(30) Foreign Application Priority Data
May 20, 2019   (CN) .......................... 201910419188.6

(51) Int. Cl.
*G02F 1/1335* (2006.01)

(52) U.S. Cl.
CPC .. *G02F 1/133514* (2013.01); *G02F 1/133512* (2013.01)

(58) Field of Classification Search
CPC ..................... G02F 1/133514; G02F 1/133512
USPC .......................................................... 349/106
See application file for complete search history.

(56) References Cited

U.S. PATENT DOCUMENTS

2013/0278858 A1* 10/2013 Hashimoto ....... G02F 1/133512
349/58

FOREIGN PATENT DOCUMENTS

| CN | 102455551 A | 5/2012 |
|---|---|---|
| CN | 203337945 U | 12/2013 |
| CN | 105425457 A | 3/2016 |
| CN | 105954922 A | 9/2016 |
| JP | 2016180960 A | 10/2016 |

* cited by examiner

*Primary Examiner* — Nathanael R Briggs
*Assistant Examiner* — William D Peterson

(57) ABSTRACT

A color filter substrate and a display device are provided. The color filter substrate includes a color filter base and a black matrix layer. The color filter base includes an active area and a frame area disposed beside the active area. The black matrix layer is disposed on the color filter substrate and positioned in the active area and a portion of the frame area. An edge of the frame area of the color filter base is provided with a groove.

14 Claims, 1 Drawing Sheet

COLOR FILTER SUBSTRATE AND DISPLAY DEVICE

FIELD OF INVENTION

The present disclosure relates to the field of display technologies, and more particularly to a color filter substrate and a display device.

BACKGROUND OF INVENTION

A black matrix layer disposed on a side of a current color filter substrate is directly connected to the outside, risk of moisture invading an inside of a display device along the black matrix layer is high, and when laser cutting is performed to the display device, laser contacts the black matrix layer, this causes an edge of the black matrix layer to be detached from the color filter substrate to reduce yield.

Therefore, there is a need to provide a color filter substrate and a display device to solve issues of the prior art.

SUMMARY OF INVENTION

In order to solve the above technical problems, an object of an embodiment of the present disclosure is to provide a color filter substrate and a display device capable of isolating direct contact between external moisture and a black matrix layer, thereby reducing risk of moisture intrusion.

To achieve the above object, an embodiment of the present disclosure provides a color filter substrate. The color filter substrate includes a color filter base and a black matrix layer. The color filter base includes an active area and a frame area disposed beside the active area. The black matrix layer is disposed on the color filter base and is positioned in the active area and a portion of the frame area. An edge of the frame area of the color filter base is provided with a groove, and the black matrix layer and the edge of the frame area of the color filter base are spaced apart from each other by the groove. The black matrix layer is disposed next to the groove. A thickness of the black matrix layer is equal to a thickness of the groove.

In an embodiment of the present disclosure, a length of the groove is less than 0.7 mm.

In an embodiment of the present disclosure, a length of the frame area of the color filter base is equal to 0.7 mm.

In an embodiment of the present disclosure, the edge of the frame area of the color filter base is aligned with a laser cutting line.

In an embodiment of the present disclosure, the black matrix layer and the laser cutting line are spaced apart from each other by the groove.

An embodiment of the present disclosure further provides a color filter substrate. The color filter substrate includes a color filter base and a black matrix layer. The color filter base includes an active area and a frame area disposed beside the active area. The black matrix layer is disposed on the color filter base and is positioned in the active area and a portion of the frame area. An edge of the frame area of the color filter base is provided with a groove, and the black matrix layer and the edge of the frame area of the color filter base are spaced apart from each other by the groove.

In an embodiment of the present disclosure, the black matrix layer is disposed next to the groove.

In an embodiment of the present disclosure, a length of the groove is less than 0.7 mm.

In an embodiment of the present disclosure, a thickness of the black matrix layer is equal to a thickness of the groove.

In an embodiment of the present disclosure, a length of the frame area of the color filter base is equal to 0.7 mm.

In an embodiment of the present disclosure, the edge of the frame area of the color filter base is aligned with a laser cutting line.

In an embodiment of the present disclosure, the black matrix layer and the laser cutting line are spaced apart from each other by the groove.

An embodiment of the present disclosure further provides a display device. The display device includes a color filter substrate, a thin film transistor substrate disposed opposite to the color filter substrate, and a liquid crystal layer disposed between the color filter substrate and the thin film transistor substrate. The color filter substrate includes a color filter base and a black matrix layer. The color filter base includes an active area and a frame area disposed beside the active area. The black matrix layer is disposed on the color filter base and is positioned in the active area and a portion of the frame area. An edge of the frame area of the color filter base is provided with a groove, and the black matrix layer and the edge of the frame area of the color filter base are spaced apart from each other by the groove.

In an embodiment of the present disclosure, the display device further includes a protective layer, a first polyimide layer, and a spacer layer sequentially disposed on the color filter base.

In an embodiment of the present disclosure, the display device further includes a gate driver on array (GOA) circuit, a planarization layer, and a second polyimide layer sequentially disposed on the thin film transistor substrate.

In an embodiment of the present disclosure, the black matrix layer is disposed next to the groove.

In an embodiment of the present disclosure, a length of the groove is less than 0.7 mm.

In an embodiment of the present disclosure, a thickness of the black matrix layer is equal to a thickness of the groove.

In an embodiment of the present disclosure, a length of the frame area of the color filter base is equal to 0.7 mm.

In an embodiment of the present disclosure, the edge of the frame area of the color filter base is aligned with a laser cutting line, and the black matrix layer and the laser cutting line are spaced apart from each other by the groove.

Beneficial effects of an embodiment of the present disclosure are that, in the color filter substrate and the display device of the embodiment of the present disclosure, the black matrix layer is disposed on the color filter substrate and positioned in the active area and a portion of the frame region, an edge of the frame area of the color filter base is provided with a groove, and the black matrix layer and the edge of the frame area of the color filter base are spaced apart from each other by the groove, so as to isolate direct contact between external moisture and the black matrix layer, thereby reducing risk of moisture intrusion.

DETAILED DESCRIPTION OF PREFERRED EMBODIMENTS

Figure 1:
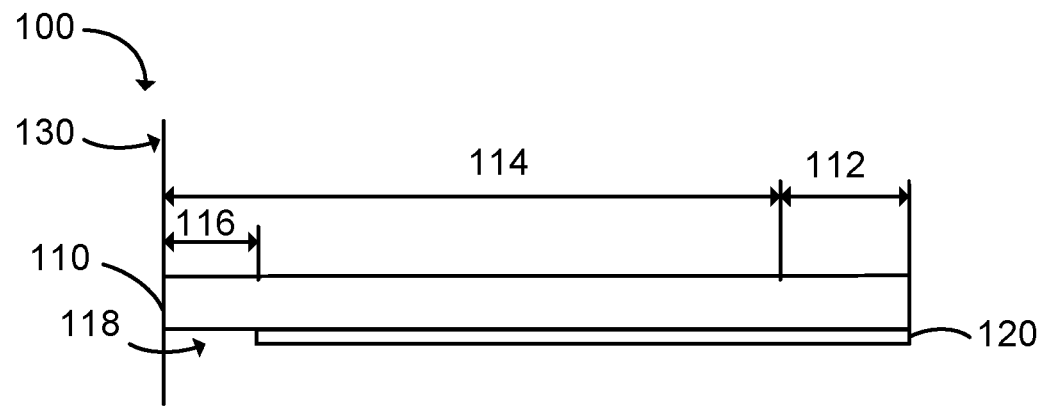
FIG. 1 is schematic structural view of a color filter substrate according to an embodiment of the present disclosure.

The following description of the various embodiments is provided to illustrate the specific embodiments by referring to the accompanying drawings.

The above and other objects, features, and advantages of the present disclosure will be more apparent and obvious. Hereinafter, the preferred embodiments of the present disclosure will be described in detail with reference to the accompanying drawings. In addition, directional terms described by the present disclosure, such as up, down, top, bottom, front, back, left, right, inner, outer, side, surrounding, central, level, horizontal, vertical, perpendicular, axial, radial, uppermost, lowermost, etc., are only directions by referring to the accompanying drawings, and thus the used terms are used only for the purpose of describing embodiments of the present disclosure and are not intended to be limiting of the present disclosure.

In the drawings, units with similar structures are labeled with the same reference number.

Referring to FIG. 1, an embodiment of the present disclosure provides a color filter substrate 100. The color filter substrate 100 includes a color filter base 110 and a black matrix layer 120. The color filter base 110 includes an active area 112 and a frame area 114 disposed beside the active area 112. The black matrix layer 120 is disposed on the color filter base 110 and is positioned in the active area 112 and a portion of the frame area 114. An edge 116 of the frame area 114 of the color filter base 110 is provided with a groove 118, and the black matrix layer 120 and the edge 116 of the frame area 114 of the color filter base 110 are spaced apart from each other by the groove 118, so as to isolate direct contact between external moisture and the black matrix layer 120, thereby reducing risk of moisture intrusion.

In an embodiment of the present disclosure, the black matrix layer 120 is disposed next to the groove 118. A length of the groove is less than 0.7 mm. A thickness of the black matrix layer 120 is equal to a thickness of the groove 118.

In an embodiment of the present disclosure, a length of the frame area 114 of the color filter base 110 is equal to 0.7 mm. The edge 116 of the frame area 114 of the color filter base 110 is aligned with a laser cutting line 130.

In an embodiment of the present disclosure, the black matrix layer 120 and the laser cutting line 130 are spaced apart from each other by the groove 118.

Figure 2:
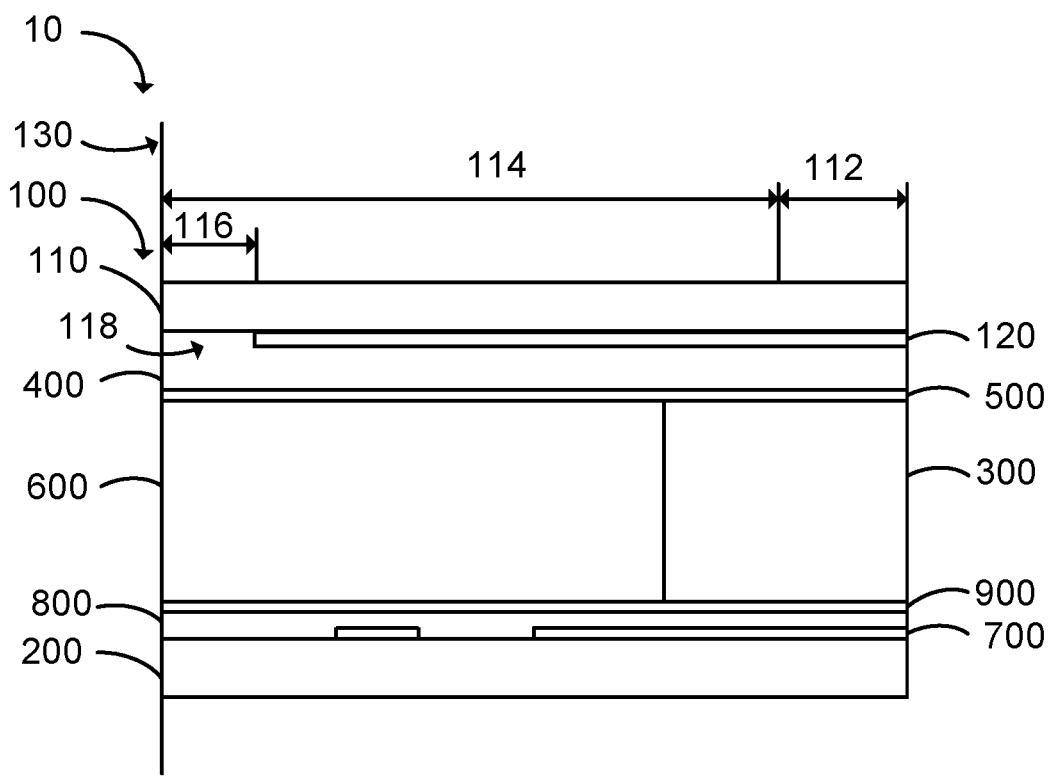
FIG. 2 is schematic structural view of a display device according to an embodiment of the present disclosure.

Referring to FIG. 2, an embodiment of the present disclosure further provides a display device 10. The display device 10 includes the above color filter substrate 100, a thin film transistor substrate 200 disposed opposite to the color filter substrate 100, and a liquid crystal layer 300 disposed between the color filter substrate 100 and the thin film transistor substrate 200.

In an embodiment of the present disclosure, the display device 10 further includes a protective layer 400, a first polyimide layer 500, and a spacer layer 600 sequentially disposed on the color filter base 100.

In an embodiment of the present disclosure, the display device 10 further includes a gate driver on array (GOA) circuit 700, a planarization layer 800, and a second polyimide layer 900 sequentially disposed on the thin film transistor substrate 200.

In an embodiment of the present disclosure, the color filter substrate 100 can be divided into six film layers during a production process, for example, the six film layers include the black matrix layer 120, a red color resistance, a green color resistance, a blue color resistance, the protective layer 400, and the spacer layer 600. After the black matrix layer 120 is coated, the black matrix layer 120 disposed on the edge 116 of the frame region 114 of the color filter base 110 is removed by exposure and development to form the groove 118.

In an embodiment of the present disclosure, the color filter substrate 100 forms the groove 118 at the edge 116 of the frame area 114 of the color filter base 110 to isolate contact between external moisture and the black matrix layer 120 to enhance moisture resistance of a narrow bezel product. Forming the groove 118 at the edge 116 of the frame area 114 of the color filter base 110 can reduce defects caused by laser cutting and improve yield.

In summary, in the color filter substrate and the display device of the embodiment of the present disclosure, the black matrix layer is disposed on the color filter substrate and positioned in the active area and a portion of the frame region, an edge of the frame area of the color filter base is provided with a groove, and the black matrix layer and the edge of the frame area of the color filter base are spaced apart from each other by the groove, so as to isolate direct contact between external moisture and the black matrix layer, thereby reducing risk of moisture intrusion.

Although the present disclosure is described via one or more embodiments, those of ordinary skill in the art can come up with equivalent variations and modifications based upon the understanding of the specification and the accompanying drawings. The present disclosure includes all such modifications and variations and is only limited by the scope of the appended claims. In particular, as to the various functions performed by the components described above, the terms used to describe the components are intended to correspond to any component performing the specific functions (e.g., which are functionally equivalent) of the components (unless otherwise indicated), even those which are structurally different from the disclosed structure for performing the functions in the exemplary embodiments in the specification shown herein. In addition, although a particular feature in the specification is disclosed in only one of many embodiments, this feature may be combined with one or more features in other embodiments which are desirable and advantageous to a given or particular application. Moreover, the terms "include", "have", "consist of", or variations thereof used in the detailed description or the claims are intended to be used in a manner similar to the term "comprising".

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

What is claimed is:

1. A color filter substrate, comprising:
    a color filter base comprising an active area and a frame area disposed beside the active area; and
    a black matrix layer disposed on the color filter base and positioned in the active area and a portion of the frame area;
    wherein an edge of the frame area of the color filter base is provided with a groove, and the black matrix layer and the edge of the frame area of the color filter base are spaced apart from each other by the groove;
    wherein the black matrix layer is disposed next to the groove;
    wherein a thickness of the black matrix layer is equal to a thickness of the groove; and
    wherein a length of the groove is less than 0.7 mm, a length of the frame area of the color filter base is equal to 0.7 mm, and after the black matrix layer is coated, the black matrix layer disposed on the edge of the frame area of the color filter base is removed by exposure and development to form the groove.

2. The color filter substrate according to claim 1, wherein the edge of the frame area of the color filter base is aligned with a laser cutting line.

3. The color filter substrate according to claim 2, wherein the black matrix layer and the laser cutting line are spaced apart from each other by the groove.

4. A color filter substrate, comprising:
a color filter base comprising an active area and a frame area disposed beside the active area; and
a black matrix layer disposed on the color filter base and positioned in the active area and a portion of the frame area;
wherein an edge of the frame area of the color filter base is provided with a groove, and the black matrix layer and the edge of the frame area of the color filter base are spaced apart from each other by the groove; and
wherein a length of the groove is less than 0.7 mm, a length of the frame area of the color filter base is equal to 0.7 mm, and after the black matrix layer is coated, the black matrix layer disposed on the edge of the frame area of the color filter base is removed by exposure and development to form the groove.

5. The color filter substrate according to claim 4, wherein the black matrix layer is disposed next to the groove.

6. The color filter substrate according to claim 4, wherein a thickness of the black matrix layer is equal to a thickness of the groove.

7. The color filter substrate according to claim 4, wherein the edge of the frame area of the color filter base is aligned with a laser cutting line.

8. The color filter substrate according to claim 7, wherein the black matrix layer and the laser cutting line are spaced apart from each other by the groove.

9. A display device, comprising:
a color filter substrate;
a thin film transistor substrate disposed opposite to the color filter substrate; and
a liquid crystal layer disposed between the color filter substrate and the thin film transistor substrate;
wherein the color filter substrate comprises:
a color filter base comprising an active area and a frame area disposed beside the active area; and
a black matrix layer disposed on the color filter base and positioned in the active area and a portion of the frame area;
wherein an edge of the frame area of the color filter base is provided with a groove, and the black matrix layer and the edge of the frame area of the color filter base are spaced apart from each other by the groove; and
wherein a length of the groove is less than 0.7 mm, a length of the frame area of the color filter base is equal to 0.7 mm, and after the black matrix layer is coated, the black matrix layer disposed on the edge of the frame area of the color filter base is removed by exposure and development to form the groove.

10. The display device according to claim 9, further comprising a protective layer, a first polyimide layer, and a spacer layer sequentially disposed on the color filter base.

11. The display device according to claim 10, further comprising a gate driver on array (GOA) circuit, a planarization layer, and a second polyimide layer sequentially disposed on the thin film transistor substrate.

12. The display device according to claim 9, wherein the black matrix layer is disposed next to the groove.

13. The display device according to claim 9, wherein a thickness of the black matrix layer is equal to a thickness of the groove.

14. The display device according to claim 9, wherein the edge of the frame area of the color filter base is aligned with a laser cutting line, and the black matrix layer and the laser cutting line are spaced apart from each other by the groove.

* * * * *